(No Model.)
5 Sheets—Sheet 1.
C. T. SCHOEN.
CAR SPRING.
No. 347,647. Patented Aug. 17, 1886.
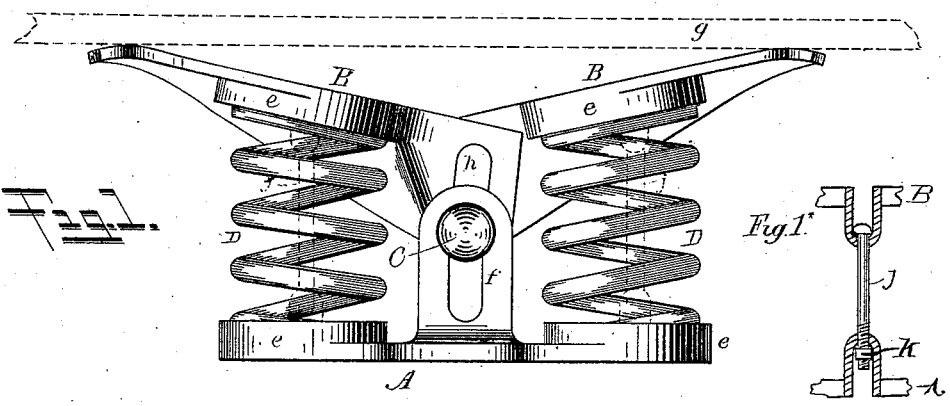
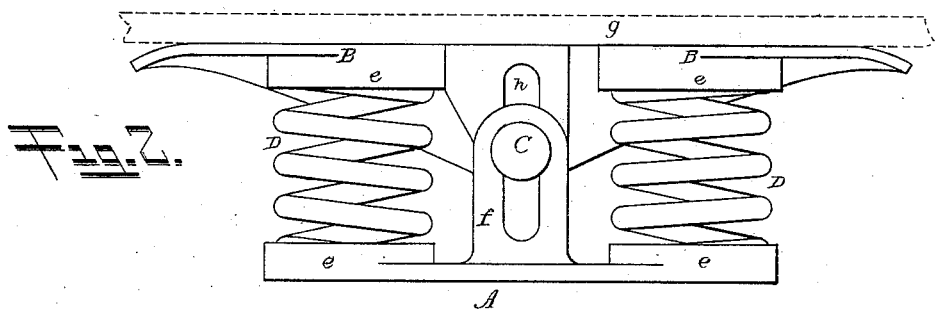
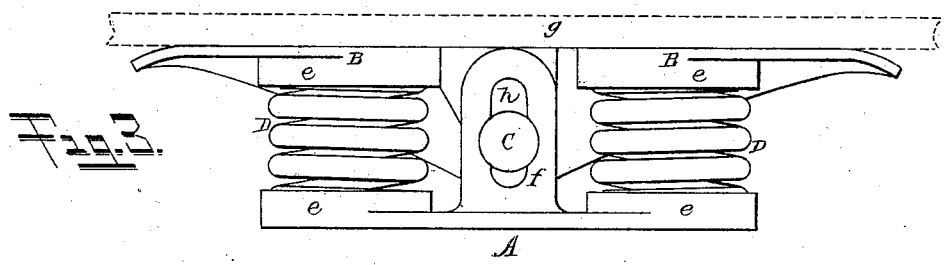
WITNESSES
Will T Norton
John J Halsted
INVENTOR
Chas T Schoen
Attorney (No Model.) 5 Sheets—Sheet 2.

C. T. SCHOEN.
CAR SPRING.

No. 347,647. Patented Aug. 17, 1886.

WITNESSES
Will. T. Norton
John J. Halsted

INVENTOR
Chas T. Schoen

Attorney (No Model.)
5 Sheets—Sheet 3.
C. T. SCHOEN.
CAR SPRING.
No. 347,647. Patented Aug. 17, 1886.
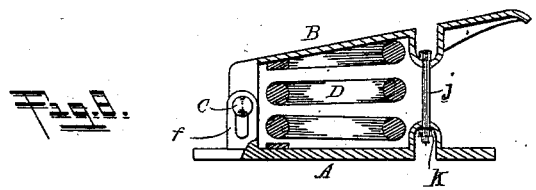
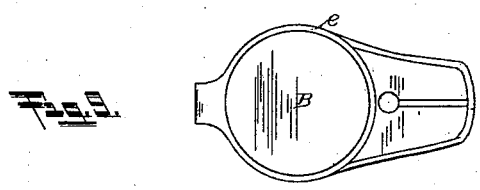
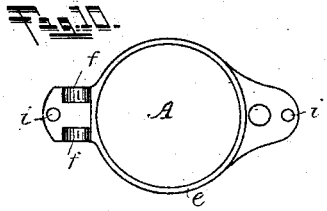
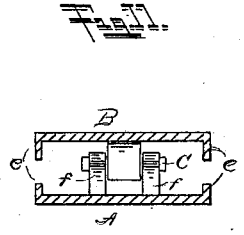
WITNESSES
Will T. Norton
John J. Halsted
INVENTOR
Chas T Schoen
Attorney (No Model.)

C. T. SCHOEN.
CAR SPRING.

No. 347,647. Patented Aug. 17, 1886.

WITNESSES
Will T. Norton
John J. Halsted

INVENTOR
Chas. T. Schoen

Attorney (No Model.)
C. T. SCHOEN.
CAR SPRING.
No. 347,647. Patented Aug. 17, 1886.
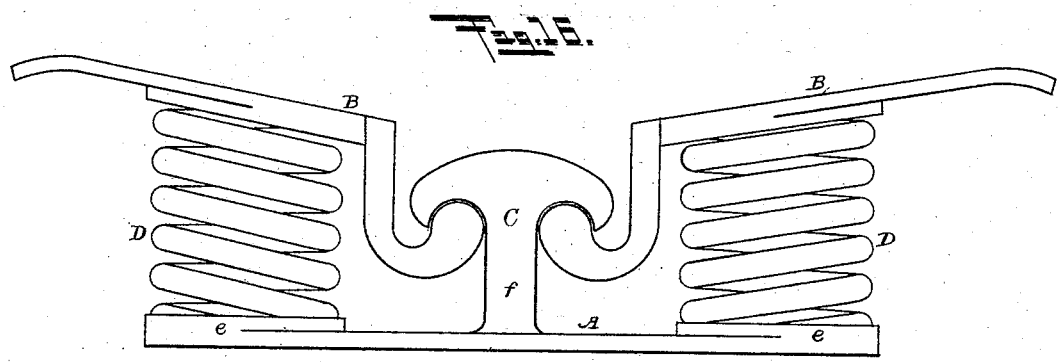
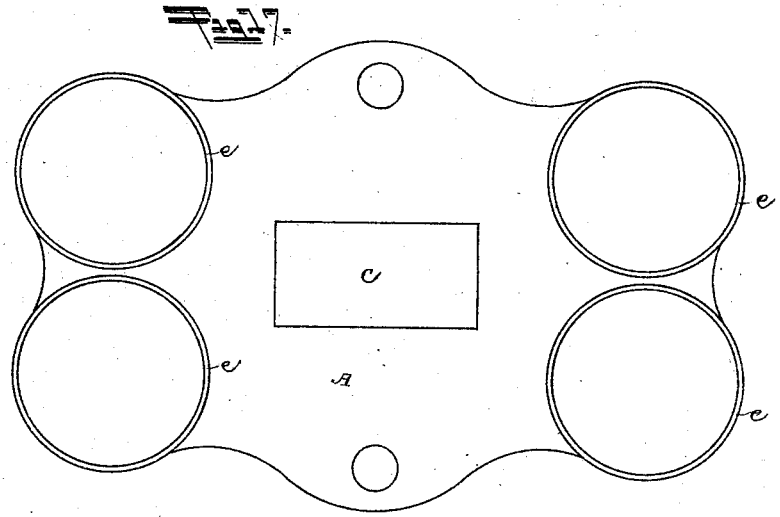
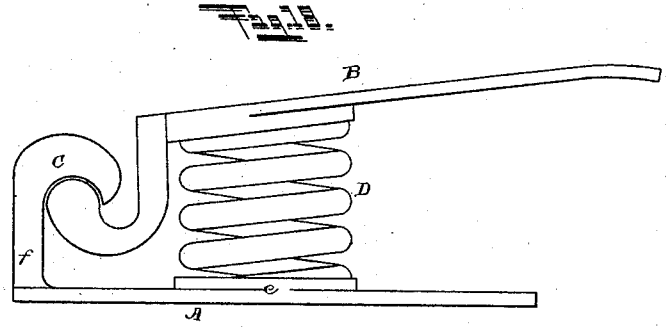
WITNESSES
Will T. Norton
W. R. Davis
INVENTOR
Charles T. Schoen
By John J. Halsted & Son
his Attorneys,

UNITED STATES PATENT OFFICE.

CHARLES T. SCHOEN, OF PHILADELPHIA, PENNSYLVANIA.

CAR-SPRING.

SPECIFICATION forming part of Letters Patent No. 347,647, dated August 17, 1886.

Application filed March 30, 1886. Serial No. 197,198. (No model.)

*To all whom it may concern:*

Be it known that I, CHARLES T. SCHOEN, of Philadelphia, in the county of Philadelphia and State of Pennsylvania, have invented certain new and useful Improvements in Car-Spring and Lever Combined; and I do hereby declare that the following is a full, clear, and exact decription of the invention, which will enable others skilled in the art to which it appertains to make and use the same, reference being had to the accompanying drawings, and to letters of reference marked thereon, which form a part of this specification.

My invention relates to a special character of construction of springs adapted for railway-cars; and it not only involves the feature of a lever or levers combined with the spiral or other spring or springs employed, but under novel conditions which will presently be stated, and in which the top plate (whether one or more such plates be used) is fulcramed to the metal bottom plate, or in other words, the top plate, preferably of metal, is not only a lever, but is also attached to the bottom plate, such bottom plate affording a fulcrum-bearing for the lever or levers, the plates and their interposed springs, (whether such springs be of metal or rubber, and whether spiral or not,) when combined, constituting a completed structure all ready for transportation or for being applied directly to the car. My improved structure also embodies the principle of self-adaptation to the varying weight or pressure of the load through the instrumentality of the lever or levers, and whereby it has the requisite variable capacity for resisting such weight or pressure, and besides, the entire spring in all its parts is self-contained and requires no special construction or framing for its use.

Figure 4:
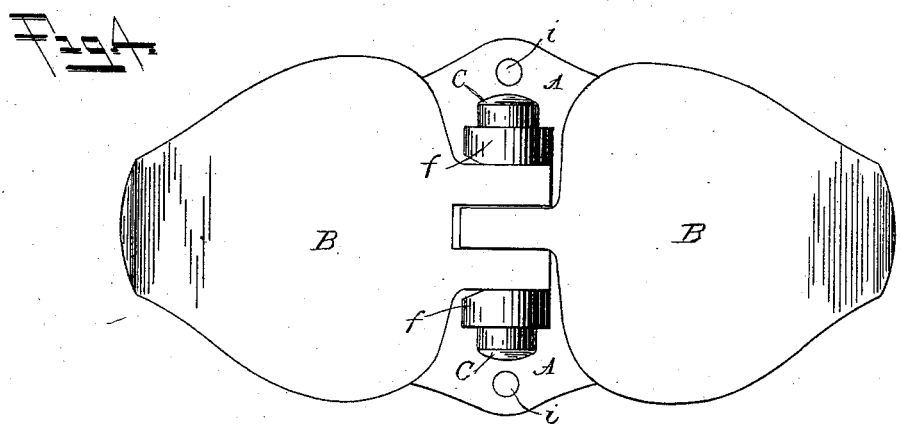
Figure 5:
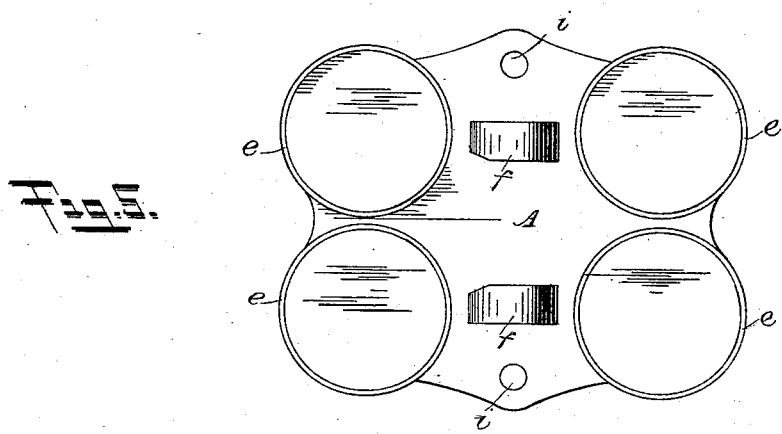
Figures 6, 7:
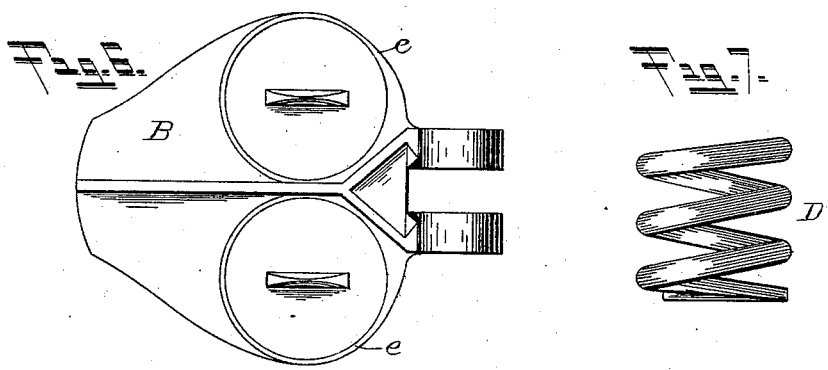
Figure 12:
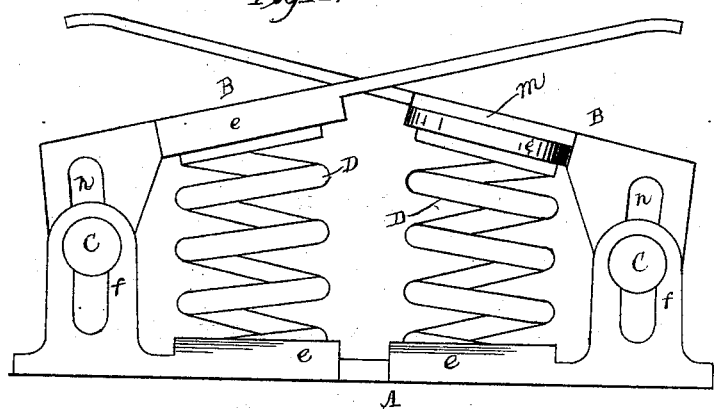
Figure 13:
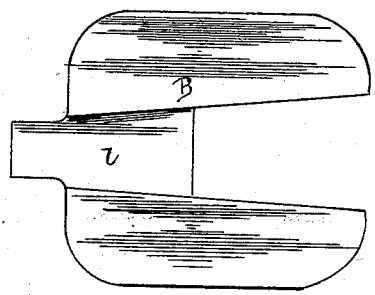
Figure 14:
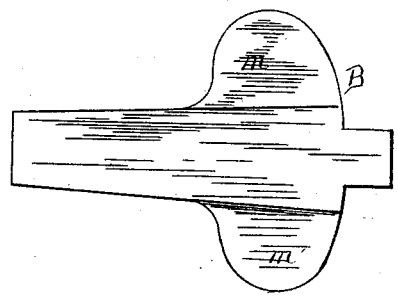
Figure 15:
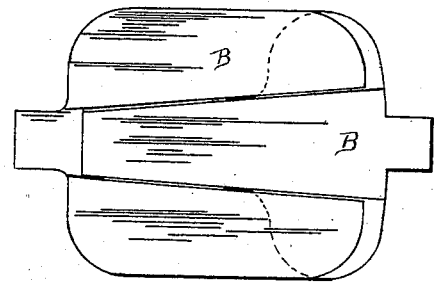

In the drawings, Figure 1 is a side elevation of a form of my improved car-spring, having two levers and several spirals, and showing the levers in their normal position; Fig. 1\*, a detail; Fig. 2, an elevation of the same, showing the levers when pressed to a horizontal position; Fig. 3, an elevation showing the levers and spring when forced down lower than in Fig. 2. Fig. 4 is a plan view. Fig. 5 is a plan view of the bottom plate detached; Fig. 6, a view showing the under side of one of the levers; Fig. 7, a view of one of the spirals, showing the incline of its top as adapted for the incline of the lever. Figs. 8, 9, 10, and 11 are respectively an elevation partly in section, an under side view of a top plate, a top view of the bottom plate, and a cross-section, all on a reduced scale, of one of my improved structures having but one lever and one coiled spring, the spring being omitted in Fig. 11. Fig. 12 is a side elevation showing an arrangement in which the levers are reversed; Fig. 13, a top view (reduced) of one of such levers; Fig. 14, a top view (reduced) of the other of such levers; Fig. 15, a top view (reduced) of both levers when in place, and when the spring is compressed so as to bring both levers to the same horizontal plane. Fig. 16 is an elevation of my improved spring in which the levers are held to the plate, each by an independent bearing; Fig. 17, a plan of the bed-plate of Fig. 16, and Fig. 18, an elevation of a car spring having but one lever, such as shown in Fig. 16.

Referring first to Figs. 1 to 7, inclusive, A is the lower plate, which supports the remainder of the structure.

B B are upper lever-plates, which may be fulcrumed or pivoted or connected to the lower plate in any way which will serve to hold them to such lower plate, and yet permit them to move as levers on their fulcra, or, preferably, upon a common axis or fulcrum, C.

D D are spiral springs, placed upon the lower plate, and between it and each of the lever-plates B. It is preferable that the lower plate, A, and the lever-plates B should each have a recess or rim, as shown at *e e*, adapted for receiving within it the upper and lower end, respectively, of the spirals. The lower plate, A, is shown as having projections or lugs *f f*, to which the inner ends of the levers are bolted, the bolt serving as the fulcrum. It will be evident that each lever may be independently fulcrumed or hinged to the plate A, instead of both levers having a common fulcrum. The outer or free ends of the levers normally incline upward when the car is empty or lightly loaded, and they project beyond the spirals or coiled springs, and the initial pressure of the weight or load is upon the outer ends of the levers. Inasmuch as the levers are set at an incline, the upper ends of the spirals are on an angle parallel to such incline, and the end of the bars from which the spirals are made being tapered down lighter than the remaining portion, such end yields readily and assumes a line parallel to the lower end of the spiral, when a sufficient pressure is applied to bring the inclined upper plate into a horizontal line — that is, parallel with the lower plate, and at which point the lever effect of the upper plate ceases, and the whole resisting-power of the spirals is thereafter exerted under any further pressure or load, and the lower plate sustains all the pressure at every stage. It will be understood that the leverage of the levers of the upper plates is greatest when the weight is least, because the point of contact of the bolster $g$ with the lever is then farthest from the fulcrum of the lever, and as every increase of weight or pressure brings this point of contact nearer to the fulcrum, this leverage diminishes, and the result is, as nearly as practicable, an equality of action at all times on the springs, whether the load be little or much, a continued increase of weight or pressure shortening the leverage from its maximum to zero, the latter point being reached when the upper and lower plates are brought to a parallelism, and at which point the upper plates act no longer as levers, the springs at this stage taking all the pressure and weight unassisted by any leverage whatever, and the under plate always holding the levers and supporting all. In my construction, the power of the spiral springs, which sustain the load, is thoroughly graduated. The initial pressure is applied at the outer ends of the upper plate, (or plates, if more than one be used,) their inner ends being fulcrumed at or near the center of the lower plate. This causes the springs to yield softly and easily, and as the load is increased and the levers consequently borne downward, their operative leverage is proportionately shortened, thus causing the spring to adapt itself automatically to sustain either an increasing or a decreasing load. The levers, as before stated, ceasing to act as such when parallel with their attached under plate, they are then relieved of undue strain, and by having the levers capable of being moved bodily downward while in this position of parallelism further direct pressure on the springs is permitted. This is provided for by having the bolt or axis C supported in vertically-elongated holes or slots, $h$, or by any other equivalent mechanical means, which will permit the lever to have a vertically-shifting fulcrum. The lower plate is provided with holes $i$, by which it may be readily secured to a car, and as the spirals do not rest on any wooden part of a car, any damage or wearing away of such wood-work by the springs or its adjacent parts is avoided.

In Figs. 8, 9, 10, 11, I have illustrated the same invention with a single upper plate fulcrumed to the lower or bed plate, the principle of action being substantially the same as heretofore stated. In this form it is advisable to use a bolt or rod, $j$, to hold the plates from separating too far, and this rod may be provided with an adjusting-nut, $k$, as shown, the bolt-head and the nut being preferably sunk in cavities in the plate.

In Fig. 1 I have also shown a similar rod, nut, and cups or cavities, and which may be used in any of my forms of construction.

In the arrangement of levers as shown in Fig. 12, their fulcra being farther removed from the center, as great a length of the levers is allowed, and yet all within the length of the lower plate. This in some cases is an advantage, on account of the limited space allowed in a car for a spring.

Figs. 13, 14, and 15 illustrate the levers applicable for Fig. 12, Fig. 13 having a recess or groove, $l$, to receive the free end of the other lever, and Fig. 14 having recesses $m$ $m$, to receive the two projecting ends of the lever shown in Fig. 13. When the springs are compressed to the same level or horizontal position, they are thus both enabled to lie flush or in the same plane. Two or more concentric spiral springs may, if desired, be used in the place of a single spiral. Preferably the flange on the top plate or lever-plate should be considerably deeper (say from two to three times) at the front end of the plate, than at its other end, thus better holding the spirals to place when the lever is inclined, and also to give additional strength to the lever when needed. The flange on the lower plate may be of even height all around and about as high as the rear part of the flange of the top lever-plate.

My improved structure entire can be readily adapted to passenger, freight, or other cars, and it has the further important advantage that it is easily interchangeable with other springs.

I am aware that a patent for an improvement in car-springs has been granted to James A. Tilden, No. 240,623, in which a lever is used, and I do not make any claim to anything contained therein.

In my invention the pressure on the lever or levers is received by an under plate, to which the upper plates or levers are fulcrumed, thereby bringing the strain upon the spiral or spirals and on the plates without relation to the other parts of the car.

It will be observed that in my construction the bearing (or fulcrum-point) of the lever is not only a fixed or immovable one, but that whenever the levers are so borne down as to become substantially horizontal, then they lose their fulcrum-bearings and are at once free to be moved downward away from such bearings by force of any additional weight or pressure—conditions which cannot exist where the fulcrum is a positively fixed one.

I claim—

1. A car-spring, in combination with top and bottom plate or plates, the top plate or plates being fulcrumed to the bottom plate, and the ends of the plate or plates being free so that they can move freely as their angles change by compression of the springs.

2. In a car-spring, a lever or levers, in combination with a bottom plate, the lever or levers being applied substantially as set forth, whereby the spiral or other spring shall be self-graduating relatively to the varying load or pressure.

CHAS. T. SCHOEN.

Witnesses:
H. B. LUFFBERRY,
CHAS. L. PARMALEE.